（12）United States Patent
Hughes et al.

(10) Patent No.: US 9,451,024 B2
(45) Date of Patent: Sep. 20, 2016

(54) SELF-ORGANIZING DISK (SOD)

(71) Applicant: FutureWei Technologies, Inc., Plano, TX (US)

(72) Inventors: James Hughes, Palo Alto, CA (US); DaoHui Wang, Shenzhen (CN); Ajit Verma, Los Altos, CA (US); John Plocher, San Jose, CA (US); Xian Liu, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 545 days.

(21) Appl. No.: 13/861,897

(22) Filed: Apr. 12, 2013

(65) Prior Publication Data

US 2014/0280765 A1  Sep. 18, 2014

Related U.S. Application Data

(60) Provisional application No. 61/794,369, filed on Mar. 15, 2013.

(51) Int. Cl.
| | |
|---|---|
| *G06F 17/30* | (2006.01) |
| *H04L 29/08* | (2006.01) |
| *G06F 3/06* | (2006.01) |
| *G06F 11/10* | (2006.01) |
| *G06F 11/20* | (2006.01) |

(52) U.S. Cl.
CPC ......... *H04L 67/1097* (2013.01); *G06F 3/0643* (2013.01); *G06F 17/30091* (2013.01); *G06F 17/30097* (2013.01); *G06F 3/065* (2013.01); *G06F 3/067* (2013.01); *G06F 3/0617* (2013.01); *G06F 11/1076* (2013.01); *G06F 11/2058* (2013.01); *G06F 2211/1088* (2013.01)

(58) Field of Classification Search
CPC .................. G06F 17/30091–17/30097; G06F 3/0638–3/0643; H04L 67/10–67/1097
See application file for complete search history.

(56) References Cited

U.S. PATENT DOCUMENTS

| | | | |
|---|---|---|---|
| 6,421,688 B1 * | 7/2002 | Song | .................... G06F 11/2025 |
| 6,697,960 B1 * | 2/2004 | Clark | .................. G06F 11/1474 |
| | | | 714/15 |

(Continued)

FOREIGN PATENT DOCUMENTS

CN          102708165 A       10/2012

OTHER PUBLICATIONS

International Search Report received in Application No. PCT/CN2014/073490, mailed Jun. 23, 2014, 13 pages.

(Continued)

*Primary Examiner* — Brendan Higa
(74) *Attorney, Agent, or Firm* — Slater Matsil, LLP

(57) ABSTRACT

System and methods for storage object distribution using a universal distributed storage (UDS) system. An embodiment UDS includes server nodes and a header server in communication with the server nodes. The header server is configured to divide an object received from a client into chunks, to assign a key to each of the chunks, to calculate a hash value for each of the keys to identify which of the server nodes will store each of the chunks, and to instruct one of the server nodes to store each of the chunks in accordance with the hash value calculated. In an embodiment, the server nodes include a single central processing unit, a single storage device, a primary network interface, and a redundant network interface.

20 Claims, 2 Drawing Sheets

(56) References Cited

U.S. PATENT DOCUMENTS

| | | | |
|---|---|---|---|
| 7,466,810 B1* | 12/2008 | Quon | H04M 3/42229 379/201.01 |
| 2003/0002494 A1* | 1/2003 | Kuukankorpi | H04L 29/12009 370/386 |
| 2003/0131119 A1* | 7/2003 | Noonan | H04L 41/00 709/232 |
| 2006/0218360 A1* | 9/2006 | Burkey | H04L 67/1095 711/154 |
| 2009/0031032 A1* | 1/2009 | Shanmugham | H04L 65/1073 709/229 |
| 2009/0187708 A1* | 7/2009 | Kurokawa | G06F 3/0617 711/114 |
| 2009/0216832 A1* | 8/2009 | Quinn | G06F 11/1076 709/203 |
| 2012/0054197 A1* | 3/2012 | San Martin | G06F 17/30486 707/747 |
| 2014/0108638 A1* | 4/2014 | Ko | H04L 43/0811 709/224 |

OTHER PUBLICATIONS

Hughes, et al., "Towards an Exabyte File System," CERN Computing Colloquium, Sep. 29, 2010, 1 pages.

Hughes, et al., "Towards and Exabyte Filesystem," Huawei Technologies Co., Ltd., www.huawei.com, Sep. 29, 2010, 48 pages.

* cited by examiner

SELF-ORGANIZING DISK (SOD)

CROSS-REFERENCE TO RELATED APPLICATIONS

This application claims the benefit of U.S. Provisional Application No. 61/794,369, filed on Mar. 3, 2013 and entitled "Self-Organizing Disk (SoD)."

TECHNICAL FIELD

The present disclosure relates to storage systems and, in particular embodiments, to distributed storage systems implementing server nodes configured in a ring.

BACKGROUND

A storage area network (SAN) is a dedicated network that provides access to consolidated, block level data storage. SANs are primarily used to make storage devices, such as disk arrays, tape libraries, and optical drives, accessible to servers so that the devices appear like they are locally attached to the operating system. A SAN typically has its own network of storage devices that are generally not accessible through the local area network by other devices. The cost and complexity of SANs has dropped to levels allowing wider adoption across both enterprise and small to medium sized business environments.

Network-attached storage (NAS) is file-level computer data storage connected to a computer network providing data access to a heterogeneous group of clients. NAS not only operates as a file server, but is specialized for this task either by its hardware, software, or configuration of those elements. NAS is often manufactured as a computer appliance—a specialized computer built from the ground up for storing and serving files—rather than simply a general purpose computer being used for the role.

NAS systems are networked appliances which contain one or more hard drives, often arranged into logical, redundant storage containers or RAID arrays. Network-attached storage removes the responsibility of file serving from other servers on the network. NAS devices are gaining popularity, as a convenient method of sharing files among multiple computers.

Unfortunately, the cost and complexity of SAN and NAS systems increases with scale. Therefore, it is difficult and expensive to deliver storage systems in the 100+ petabyte (PB) range. Indeed, existing solutions call for expensive hardware and dedicated field service engineers.

SUMMARY

An embodiment universal distributed storage (UDS) system includes server nodes and a header server in communication with the server nodes. The header server is configured to divide an object received from a client into chunks, to assign a key to each of the chunks, to calculate a hash value for each of the keys to identify which of the server nodes will store each of the chunks, and to instruct one of the server nodes to store each of the chunks in accordance with the hash value calculated.

An embodiment universal distributed storage (UDS) system includes server nodes, header servers, an operation/maintenance/billing (OM/Bill) server, and a scrubber server. Each of the header servers is in communication with the server nodes. The header servers are configured to divide an object received from a client into chunks, to assign a key to each of the chunks, to calculate a hash value for each of the keys to identify which of the server nodes will store each of the chunks, and to instruct one of the server nodes to store each of the chunks in accordance with the hash value calculated. The at least one OM/Bill server is in communication with the header servers and the server nodes. The at least one OM/Bill server is configured to update a distributed hash table storing the hash value for each of the keys and to switch off the server nodes that have malfunctioned. The at least one scrubber server is in communication with the header servers. The at least one scrubber server is configured to coordinate redundant data storage in the server nodes.

An embodiment method of storing an object using universal distributed storage (UDS) system includes dividing, using a header server, the object received from a client into chunks, assigning, using the header server, a key to each of the chunks, calculating, using the header server, a hash value for each of the keys to identify which of a plurality of server nodes will store each of the chunks, and instructing, using the header server, one of the server nodes to store each of the chunks in accordance with the hash value calculated.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely a universal distributed storage (UDS) system within a massive storage system (a.k.a., a cloud storage system). The concepts in the disclosure may also apply, however, to other types of storage systems and storage devices with other components.

Figure 1:
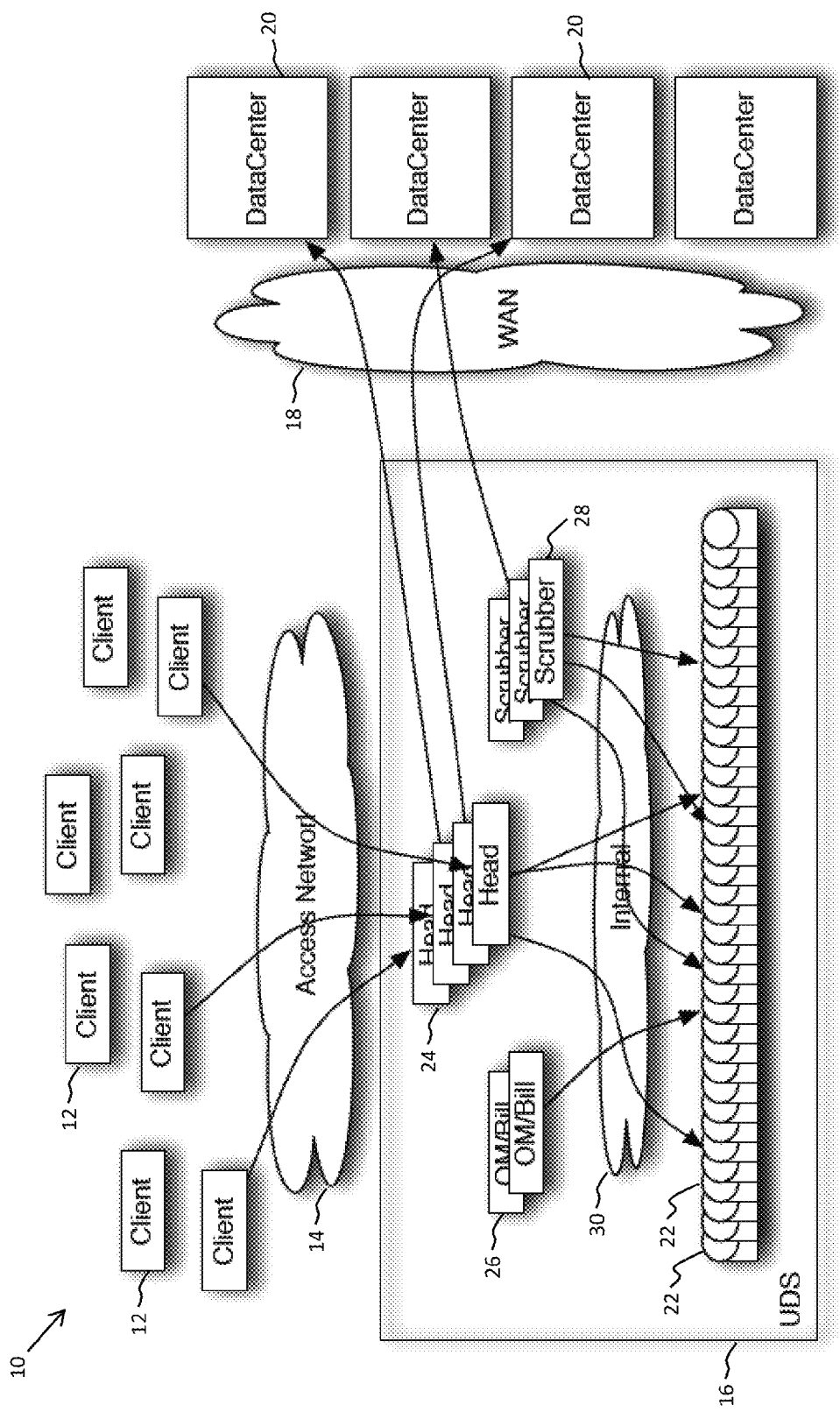
FIG. 1 illustrates a massive storage system including a universal distributed storage (UDS) system.

Referring now to FIG. 1, a massive storage system 10 is illustrated. As shown, the massive storage system 10 includes clients 12, an access network 14, a UDS system 16, a wide area network (WAN) 18, and data centers 20. As will be more fully explained below, the UDS system 16 depicted in FIG. 1 scales linearly in both price and performance. Indeed, the UDS system 16 allows for a storage systems in the 100+ petabyte (PB) range. Moreover, the UDS system 16 mitigates the effect of any processor failure by simply switching off any server nodes 22 or failed components. As such, the UDS system 16 is able to recover without human intervention.

Still referring to FIG. 1, the clients 12 are each a piece of computer hardware and/or software that accesses a service made available by a server of the UDS system 16. The clients 12 shown in FIG. 1 may be a fat client, also known as a rich client or a thick client, a thin client, or a hybrid client. The fat client performs the bulk of any data processing operations itself, and does not necessarily rely on the host system, while the thin client use the resources of the host system. The hybrid client is a mixture of the two client models. So, as illustrated in FIG. 1, the clients 12 may be a computer, server, web browser, electronic mail program, and so on.

As shown in FIG. 1, the clients 12 communicate with the UDS system 16 through the access network 14. The access network 14 may be a personal area network (PAN), a local area network (LAN), a campus area network (CAN), a metropolitan area networks (MAN), a wide area network (WAN), and so on. The access network 14 may be wireless, wired, or a combination of wireless and wired.

Still referring to FIG. 1, the UDS system 16 includes header servers 24, operation/maintenance/billing (OM/Bill) servers 26, scrubber servers 28, an internal network 30, and a plurality of the server nodes 22. It should be recognized that in practical applications the embodiment UDS system 10 may include many other components, devices, hardware, and so on, which have not been included in FIG. 1 for ease of illustration.

The header servers 24 are in communication with the clients 12 and the server nodes 22. In that regard, the header servers 24 provide an interface for the clients 12. In an embodiment, one or more of the header servers 24 is configured to generate a simple storage service (S3) interface for the clients 12. In an embodiment, one or more of the header servers 24 is configured to generate a Cloud Data Management Interface (CDMI) for the clients 12. The header servers 24 may also be equipped to provide other types of interfaces to the clients 12 to permit the clients 12 to use and take advantage of the UDS system 16.

Still referring to FIG. 1, the header servers 24 are each configured to divide an object (e.g., a video file, a data file, etc.) received from one of the clients 12 into chunks. By way of example, a header server 24 may receive a one gigabyte (1 GB) video file from one of the clients 12. When received, the header server 24 divides the 1 GB video file into smaller chunks such as, for example, one megabyte (1 MB) chunks. Therefore, the file is easier to process and handle.

The header servers 24 are also configured to assign a key to each of the chunks. In an embodiment, the key assigned to each chunk is defined by the name of the object and the number of the chunk. For example, the key for the first chunk of the video file may be represented as "videofile.1," which represents chunk "1" of the video file, the key for the second chunk of the video file may be represented as "videofile.2," which represents chunk "2" of the video file, and so on until each chunk is assigned a key.

Once each chunk has been assigned a key, a hash value is calculated for each of the keys. In an embodiment, the hash value is calculated using the MD5 hash algorithm, the SHA-1 hash algorithm, or other suitable hash functions. The hash value is used to identify which of the server nodes 22 will store each of the chunks. Indeed, each of the server nodes 22 may be given a specific range of hash values to accommodate. For example, server node A may store chucks with hash values between "0 to 1000," server node B may store chucks with hash values between "1001 to 2000," server node C may store chucks with hash values between "2001 to 3000," and so on. In an embodiment, a collection of these ranges is stored on each of the header servers 24 as a distributed hash table. The header servers 24 instruct one of the server nodes 22 to store each of the chunks in accordance with the hash value calculated.

In an embodiment, the header servers 24 expose the UDS system 16 to the clients 12 via simple put(key, hash value) and value=get(key) interfaces instead of Volume+Block or Filesystem APIs. This provides for a simpler system that scales linearly in both price and performance.

As shown in FIG. 1, the OM/Bill servers 26 are in communication with the header servers 24 and the server nodes 22. In an embodiment, if the number of available server nodes 22 changes (e.g., more server nodes 22 are added, server nodes 22 are removed from the UDS system 16, one or more server nodes 22 fails, and so on), the OM/Bill servers 26 are configured to update the distributed hash table holding the hash values. Moreover, the OM/Bill servers 26 are configured to switch off the server nodes 22 that have malfunctioned or are otherwise no longer available. In an embodiment, the OM/Bill servers 26 also manage the billing of the clients 12 for storing or accessing files in the UDS system 16.

Still referring to FIG. 1, the scrubber servers 28 are in communication with the header servers 24 and the server nodes 22. The scrubber servers 28 are configured to repair data (e.g., due to corruption, etc.) through redundancy or parity. Indeed, in an embodiment, the scrubber servers 28 are configured to use a replication factor to provide redundant data storage for the chunks in the server nodes. For example, if the replication factor is set to "2," then a second copy of each chunk is stored in one of server nodes not already storing a copy of that chunk. If the replication factor is set to "3," then second and third copies of each chunk are stored in one of server nodes not already storing a copy of that chunk. The scrubber servers 28 may also employ a parity block mechanism or scheme to provide redundant data storage for the chunks stored in the server nodes 22.

In an embodiment, the scrubber servers 28 provide redundant data storage for the chunks stored in the server nodes 22 using the data centers 20 disposed outside the UDS system 16. The data centers 20 may be an external storage system, another UDS system, and so on. In an embodiment, the scrubber servers 28 communicate with external data centers 20 through the wide area network 18. In an embodiment, a personal area network (PAN), a local area network (LAN), a campus area network (CAN), or a metropolitan area networks (MAN), and so on, may be used in place of the wide area network 18. The wide area network 18 may be wireless, wired, or a combination of wireless and wired.

Still referring to FIG. 1, the internal network 30 generally facilitates communication between the header servers 24 and the server nodes 22. In an embodiment, the internal network 30 includes one or more switches, routers, and other communications equipment. It should be recognized that in practical applications the internal network 30 may include many other components, devices, hardware, and so on, which have not been included in FIG. 1 for ease of illustration.

The server nodes 22 are in communication with the header servers 24, the OM/Bill servers 26, and the scrubber servers 28 through the internal network 30. In an embodiment, each of the server nodes 22 includes a single central processing unit (CPU) and a single storage device (e.g., storage disk). By using this simple, low-cost architecture for the server nodes 22, the server nodes 22 may be easily replicated in volume. Moreover, if the single CPU or the single storage device fails, the server node 22 may be switched off by the OM/Bill servers 26 or the header servers 24. Because the server node 22 being switched off only includes a single CPU and a single disk, a limited about of resources is lost due to the individual bad server node 22.

Indeed, the UDS system 16 uses simple server nodes 22 (i.e., 1 CPU, 1 Disk, 2x network) that can be replicated in volume, uses a distributed hash table abstraction that treats these server nodes as a ring, where HASH(key)=>node, uses a replication factor or parity block mechanism within a ring to provide data storage redundancy in case of node/disk failure. By exposing the storage system via simple put(key, value) and value=get(key) interfaces instead of Volume+Block or Filesystem APIs, a simpler system that scales linearly in both price and performance is provided. Moreover, the simple 1:1 design allows a processor failure to not effect more than one device and allows the storage system to just turn off failed components and allow the system to recover without human intervention.

In an embodiment, each of the server nodes 22 includes a primary network interface and a redundant network interface to facilitate communication with the header server 24. By including both a primary and a redundant network interface, the server node 22 may continue to operate within the UDS system 16 even if one of the network interfaces prematurely fails.

Figure 2:
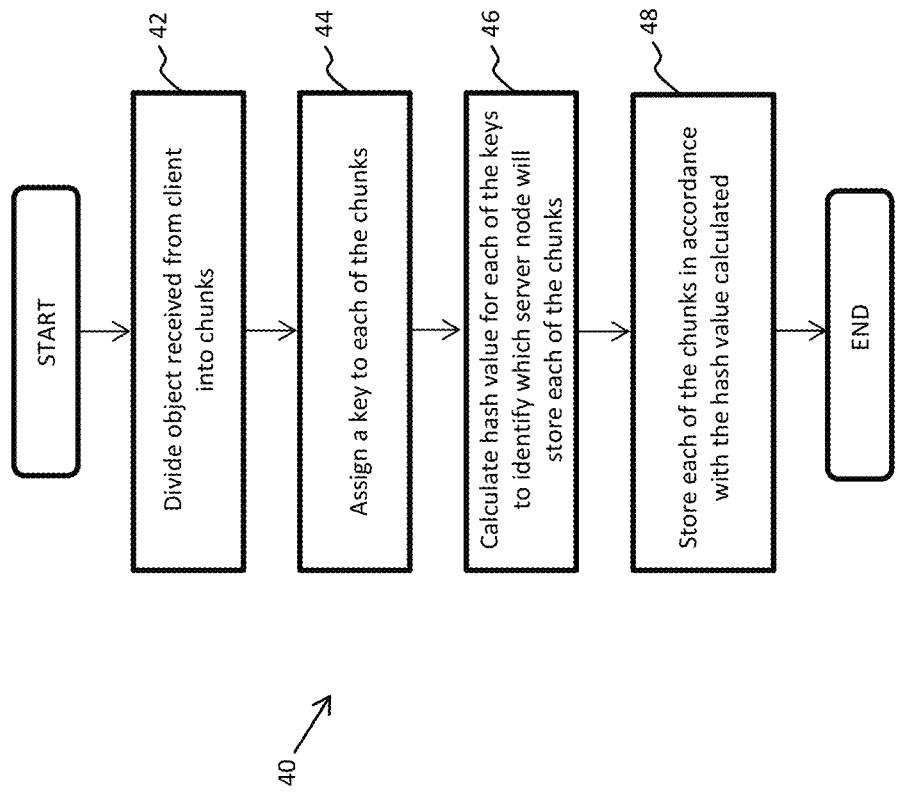
FIG. 2 illustrates an embodiment method of storing an object using the UDS system of FIG. 1.

Referring now to FIG. 2, an embodiment method 40 of storing an object using the UDS system 16 is illustrated. In block 42, the object received from a client 12 is divided into chunks by one of the header servers 24. In block 44, a key is assigned to each of the chunks by the header server 24. In block 46, a hash value for each of the keys is calculated by the header server 24 to identify which of a plurality of server nodes 22 will store each of the chunks. In block 48, one of the server nodes 22 is instructed by the header server 24 to store each of the chunks in accordance with the hash value calculated. In an embodiment, each of the chunks may be retrieved from the server nodes 22 in accordance with the hash value upon a request from the client 12.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A universal distributed storage (UDS) system, comprising:
a header server in communication with server nodes, the header server configured to:
divide an object received from a client into chunks,
assign a key to each of the chunks in accordance with a name of the object and a number of a respective one of the chunks,
calculate a hash value for each of the keys to identify which of the server nodes will store each of the chunks,
instruct one of the server nodes to store each of the chunks in accordance with the hash value calculated, and
expose the UDS system to the client via a store command having a store key parameter and a hash value parameter and via a retrieve command having a retrieve key parameter.

2. The UDS system of claim 1, wherein each of the server nodes includes a single central processing unit and a single storage device.

3. The UDS system of claim 1, wherein each of the server nodes includes a primary network interface and a redundant network interface to facilitate communication with the header server.

4. The UDS system of claim 1, wherein the header server stores the hash value for each of the keys in a distributed hash table.

5. The UDS system of claim 1, further comprising an internal network configured to facilitate communication between the header server and the server nodes, the internal network including at least one of a switch or a router.

6. The UDS system of claim 1, wherein an operation/maintenance/billing (OM/Bill) server is in communication with the header server and the server nodes, the OM/Bill server configured to update a distributed hash table storing the hash value for each of the keys.

7. The UDS system of claim 1, wherein an operation/maintenance/billing (OM/Bill) server is in communication with the header server and the server nodes, the OM/Bill server configured to switch off the server nodes that have malfunctioned and update a distributed hash table with the hash values to remove the malfunctioned server nodes.

8. The UDS system of claim 1, wherein a scrubber server is in communication with the header server and the server nodes, the scrubber server configured to use at least one of a replication factor or a parity block mechanism to provide redundant data storage for the chunks in the server nodes.

9. The UDS system of claim 1, wherein a scrubber server is in communication with the header server and the server nodes, the scrubber server configured to provide redundant data storage for the chunks using data centers outside the UDS system.

10. A universal distributed storage (UDS) system, comprising:
server nodes;
header servers, each of the header servers in communication with the server nodes, the header servers configured to divide an object received from a client into chunks, to assign a key to each of the chunks, to calculate a hash value for each of the keys to identify which of the server nodes will store each of the chunks, and to instruct one of the server nodes to store each of the chunks in accordance with the hash value calculated;
at least one operation/maintenance/billing (OM/Bill) server in communication with the header servers and the server nodes, the at least one OM/Bill server configured to update a distributed hash table storing the hash value for each of the keys and to switch off the server nodes that have malfunctioned; and
at least one scrubber server in communication with the header servers, the at least one scrubber servers configured to coordinate redundant data storage in the server nodes.

11. The UDS system of claim 10, wherein each of the server nodes includes a single central processing unit, a single storage device, a primary network interface, and a redundant network interface.

12. The UDS system of claim 10, wherein the header server is configured to store the hash value for each of the keys in the distributed hash table and to receive updated distributed hash table values from the at least one OM/Bill server in response to a number of the server nodes increasing or decreasing.

13. The UDS system of claim 10, wherein the header server is configured to generate at least one of a simple storage service (S3) interface or a Cloud Data Management Interface (CDMI) for the client.

14. The UDS system of claim 10, wherein the hash value for each of the keys is calculated using at least one of an MD5 or an SHA-1 hash function.

15. The UDS system of claim 10, wherein the at least one scrubber server is configured to provide redundant data storage of the chunks using data centers outside the UDS.

16. A method of storing an object using universal distributed storage (UDS) system, comprising:
dividing, using a header server, the object received from a client into chunks;
assigning, using the header server, a key to each of the chunks in accordance with a name of the object and a number of a respective one of the chunks;
calculating, using the header server, a hash value for each of the keys to identify which of a plurality of server nodes will store each of the chunks;
instructing, using the header server, one of the server nodes to store each of the chunks in accordance with the hash value calculated; and
exposing, using the header server, the UDS system to the client via a store command having a store key parameter and a hash value parameter and via a retrieve command having a retrieve key parameter.

17. The method of claim 16, further comprising retrieving each of the chunks from the server nodes in accordance with the hash value upon a request from the client.

18. The method of claim 16, further comprising using at least one of a replication factor or a parity block mechanism to provide redundant data storage for the chunks in the server nodes.

19. The method of claim 16, further comprising storing the chunks outside the UDS to provide redundant data storage for the chunks.

20. The method of claim 16, further comprising updating a distributed hash table of the hash values in response to a change in an available number of the server nodes.

* * * * *